(12) United States Patent
Thomas

(10) Patent No.: US 11,523,648 B1
(45) Date of Patent: Dec. 13, 2022

(54) SYNTHETIC GRASS COVERING APPARATUS

(71) Applicant: Jay Thomas, Lafayette, LA (US)

(72) Inventor: Jay Thomas, Lafayette, LA (US)

( * ) Notice: Subject to any disclaimer, the term of this patent is extended or adjusted under 35 U.S.C. 154(b) by 289 days.

(21) Appl. No.: 16/844,507

(22) Filed: Apr. 9, 2020

Related U.S. Application Data

(60) Provisional application No. 62/832,325, filed on Apr. 11, 2019.

(51) Int. Cl.
*A41G 1/00* (2006.01)
*A01M 31/02* (2006.01)

(52) U.S. Cl.
CPC ........... *A41G 1/009* (2013.01); *A01M 31/025* (2013.01)

(58) Field of Classification Search
CPC ...................................................... E01C 13/08
USPC ............................................................ 428/17
See application file for complete search history.

(56) References Cited

U.S. PATENT DOCUMENTS

| 503,827 | A | * | 8/1893 | Bush | ........................ | E01C 13/08 |
| | | | | | | 112/419 |
| 2,827,729 | A | * | 3/1958 | Hoene | ................... | A01M 31/00 |
| | | | | | | 428/17 |
| 4,138,514 | A | * | 2/1979 | Terpay | .................... | E01C 13/08 |
| | | | | | | 156/92 |
| 4,808,446 | A | * | 2/1989 | Weitz | ...................... | A41G 1/009 |
| | | | | | | 428/17 |
| 6,226,949 | B1 | * | 5/2001 | Huber | ....................... | E04D 9/00 |
| | | | | | | 428/17 |
| 7,043,875 | B1 | * | 5/2006 | Neuner | ..................... | A01G 5/04 |
| | | | | | | 47/41.15 |
| 2003/0118755 | A1 | * | 6/2003 | Motz | ........................ | E01C 13/08 |
| | | | | | | 428/17 |
| 2009/0197021 | A1 | * | 8/2009 | Jones | .................... | D03D 15/567 |
| | | | | | | 428/17 |
| 2012/0301637 | A1 | * | 11/2012 | De Vries | .................. | D03D 1/00 |
| | | | | | | 428/17 |
| 2015/0308056 | A1 | * | 10/2015 | Spittle | .................. | D06N 7/0063 |
| | | | | | | 428/17 |

* cited by examiner

*Primary Examiner* — Eyamindae C Jallow
(74) *Attorney, Agent, or Firm* — Ted M. Anthony; Sarah B. Dupont

(57) ABSTRACT

A grass covering apparatus for use in camouflaging and concealing a person during a variety of different outdoor and/or wildlife activities, particularly during hunting. A grass covering apparatus comprising a plurality of blades that are manufactured from a substantially synthetic material, wherein said synthetic grass covering apparatus is able to withstand an outdoor environment and a variety of different environment elements and remain in a substantially wet and damp environment without rotting, molding, or deteriorating.

7 Claims, 4 Drawing Sheets

SYNTHETIC GRASS COVERING APPARATUS

BACKGROUND OF THE INVENTION

Field of the Invention

The present invention pertains to a synthetic grass apparatus for use in camouflaging and concealing a person during a variety of different outdoor and/or wildlife activities. More particularly, the present invention pertains to a synthetic grass covering apparatus for use in providing a camouflaged barrier, or cover, to a hunter during outdoor hunting activities. More particularly still, the present invention pertains to a synthetic grass covering apparatus that is able to withstand a variety of different environmental elements and remain in a substantially wet and damp environment without rotting, molding, or deteriorating.

Brief Description of the Prior Art

When hunting, hunters typically use some type of camouflage or concealment in order to hide or be less visible to their game. This is done in order to have an advantage over the game in which said hunters are hunting, and thus increase their chances of having a successful hunt.

Conventional methods of camouflage or concealment are typically hunting mats or hunting blinds. A conventional hunting mat generally comprises a natural grass product; however, said natural grass products tend to rot quickly when they are left in a wet and damp environment, which is typical of a hunting environment. As such, there is a need for a hunting mat that can be used for camouflage purposes, but that will also retain its properties when in a wet and damp hunting environment.

SUMMARY OF THE INVENTION

The present invention comprises a grass covering apparatus for use in hunting and/or any other camouflaging or concealing needs, particularly in an outdoor environment or setting. Said grass covering apparatus generally comprises a plurality of grass blades that can be manufactured from a substantially synthetic material. By way of illustration, but not limitation, said synthetic grass blades can be oriented in a plurality of different configurations. For example, said synthetic grass blades can be folded and attachably connected to each other via a fastening or attachment means, such as, for example, being sewn together in order to form a substantially planar mat-like apparatus. Additionally, said synthetic grass blades can be attachably connected to each other and bunched together in order to form a substantially bundled configuration.

The synthetic grass covering apparatus has a variety of different advantages. By way of illustration, but not limitation, for example, said synthetic grass covering apparatus is used in providing a camouflaged barrier, or cover, to a hunter during outdoor hunting activities. Additionally, said synthetic grass covering apparatus is able to withstand a variety of different environmental elements and conditions, and thus, remain in a substantially wet and damp environment without rotting, molding, or deteriorating. As such, said synthetic grass covering apparatus is waterproof so that said apparatus does not freeze, break, and/or become waterlogged when exposes to said different environmental elements and conditions. Moreover, said synthetic grass covering apparatus is able to last for several years and has a blend of natural colors that will not fade and will not shine in order to add depth and realism to said apparatus.

BRIEF DESCRIPTION OF THE DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

FIG. 4 depicts a perspective view of a preferred embodiment of a synthetic grass covering apparatus of the present invention being utilized by a hunter.

DETAILED DESCRIPTION OF A PREFERRED EMBODIMENT

Figure 1:
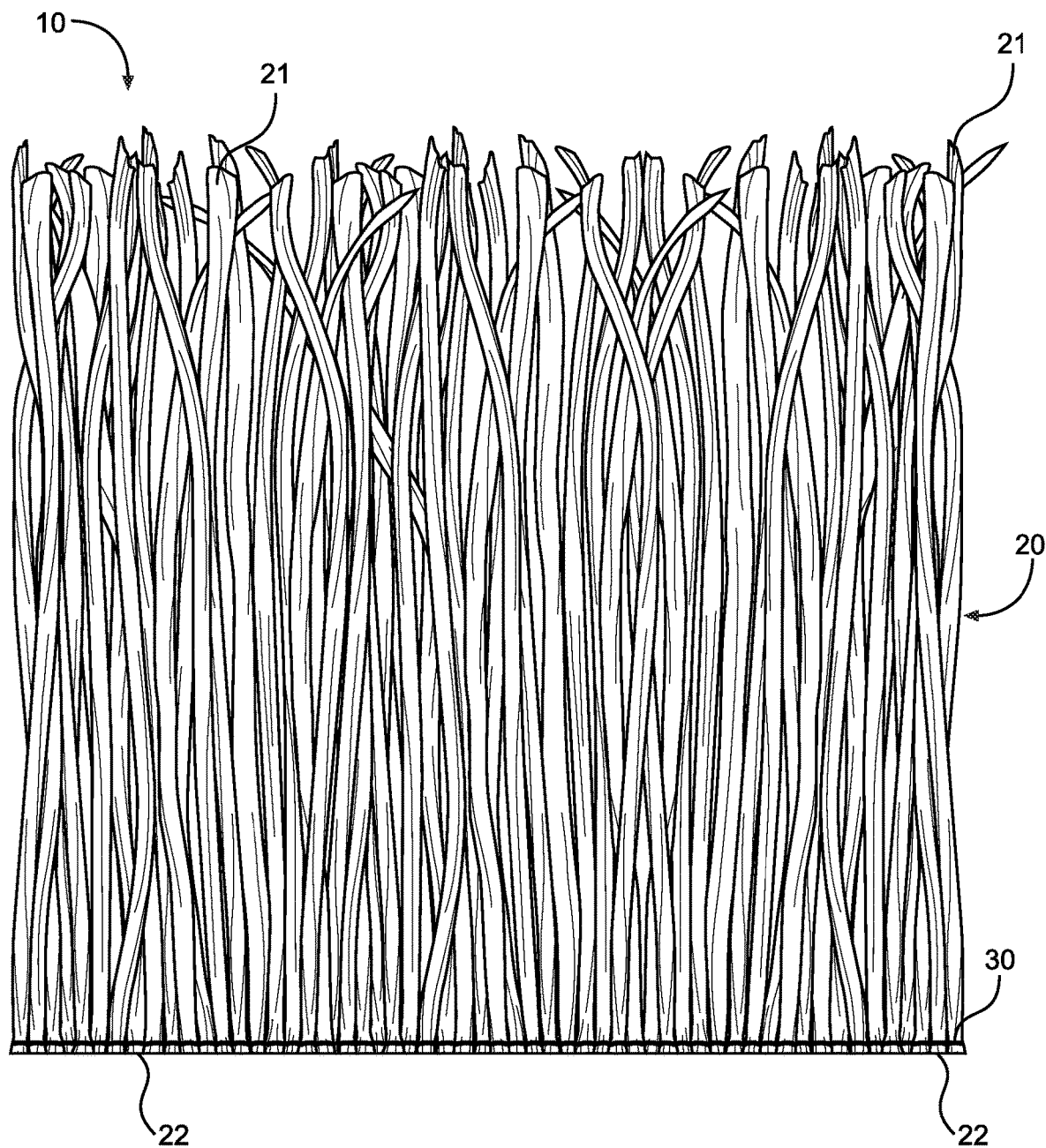
FIG. 1 depicts a front view of a preferred embodiment of a synthetic grass covering apparatus of the present invention.

Referring to the drawings, FIG. 1 depicts a grass covering apparatus 10 of the present invention, generally comprising a plurality of blades 20 that can be manufactured from a substantially synthetic material, such as for example, a resin material, or any other similar material exhibiting like characteristics. Said blades 20 can have a configuration that is typical of a real blade of grass, wherein a first end 21 of said blade 20 has a substantially tapered or jagged edge, thereby creating an illusion of being like a real blade of grass. Additionally, said blades 20 each have a substantially planar configuration, wherein said blades 20 comprising said synthetic material are manufactured in a substantially thin sheet. As a result, said grass covering apparatus 10 comprises a reversible covering, wherein said covering 10 comprises a first side and a second side, thereby being reversible and allowing either said first side or said second side to be used.

Moreover, said blades 20 can be attachably connected in a relatively side by side and planar configuration to each other in order to create a synthetic grass mat. By way of illustration, but not limitation, said synthetic grass mats can be manufactured in a variety of different sizes depending on a particular user's needs, such as, for example an approximately thirty-two (32") inch by twenty-four (24") inch mat or an approximately forty-eight (48") inch by twenty-four (24") inch mat.

Referring back to the Figures, FIG. 1 depicts a front end view of a preferred embodiment of a synthetic grass covering apparatus 10 of the present invention. Said grass covering apparatus 10 generally comprises a plurality of synthetic grass blades 20, wherein said grass blades 20 each have a first end 21 and a second end 22. As illustrated in FIG. 1, said first end 21 of said synthetic blades 20 are oriented in a substantially loose configuration relative to each blade 20, and said second end 22 of said synthetic blades 20 are attachably connected to each other.

Still referring to FIG. 1, said second end 22 of said synthetic grass blades 20 are attachably connected to each other by way of being sewn together. As such, said second end 22 of said blades 20 are generally sewn together by way of a string, a rope, or any other similar type of cord or cable 30. Thus, as illustrated in FIG. 1, said cord 30 that is sewn to said second end 22 of said synthetic blades 20 helps to keep said blades 20 together, thereby creating said synthetic grass mat.

Figure 2:
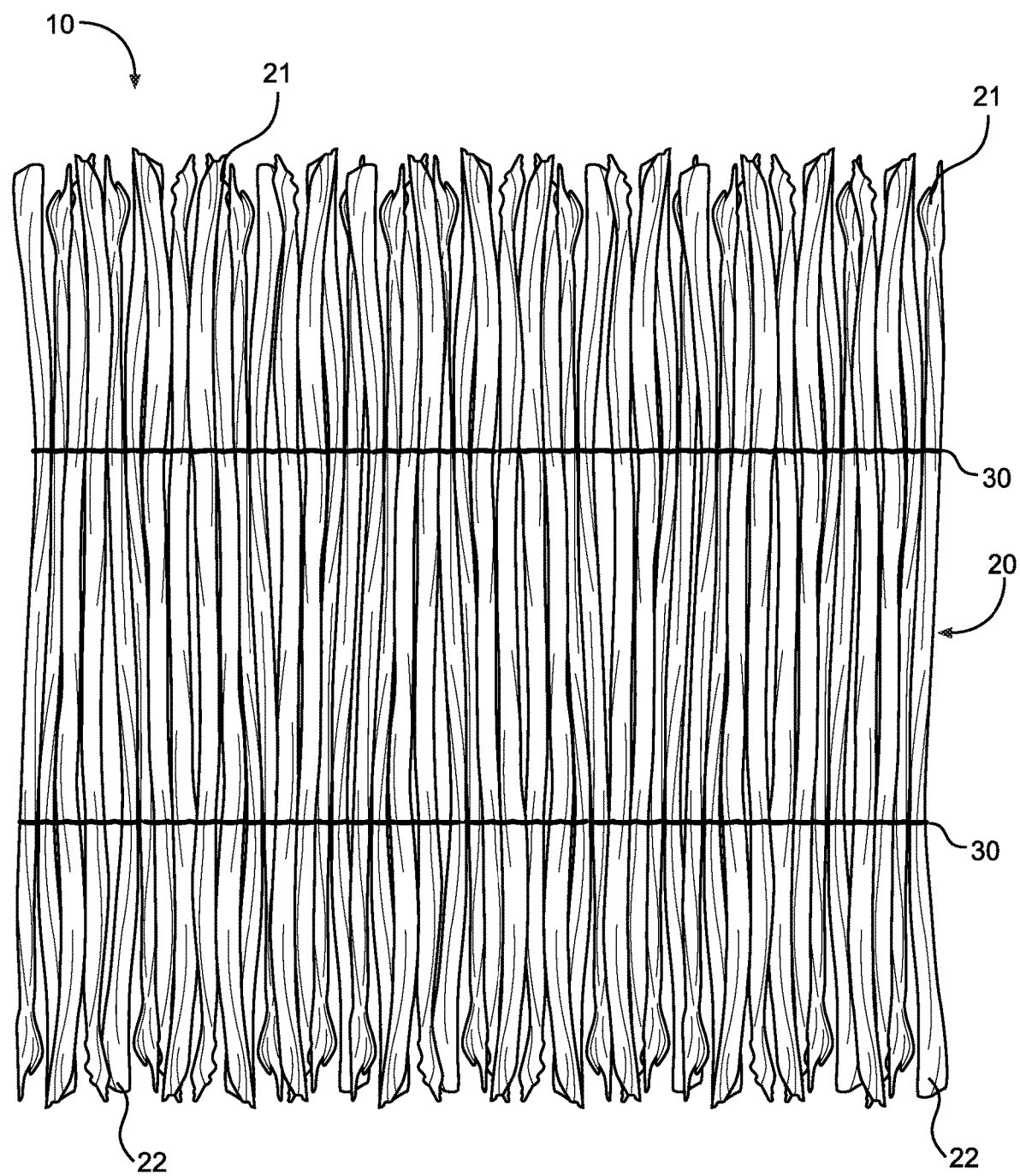
FIG. 2 depicts a front view of an alternate embodiment of a synthetic grass covering apparatus of the present invention.

FIG. 2 depicts a front end view of an alternate embodiment of a synthetic grass covering apparatus 10 of the present invention generally comprising said synthetic grass blades 20. Said blades 20 can be manufactured from a substantially synthetic material, such as for example, a resin material, or any other similar material exhibiting like characteristics, and said blades 20 can be attachably connected to each other in order to create a synthetic grass mat having a substantially planar orientation.

Still referring to FIG. 2, said grass blades 20 have said first end 21 and said second end 22, wherein said first end 21 of said blades 20 are sewn together by way of said cord 30 or cable, and said second end 22 of said blades 20 are sewn together by way of said cord 30 or cable. As such, having both said first 21 and said second ends 22 of said blades 20 sewn together creates an alternate embodiment, and thus, an alternate configuration and alternate use of said synthetic grass mats.

Figure 3:
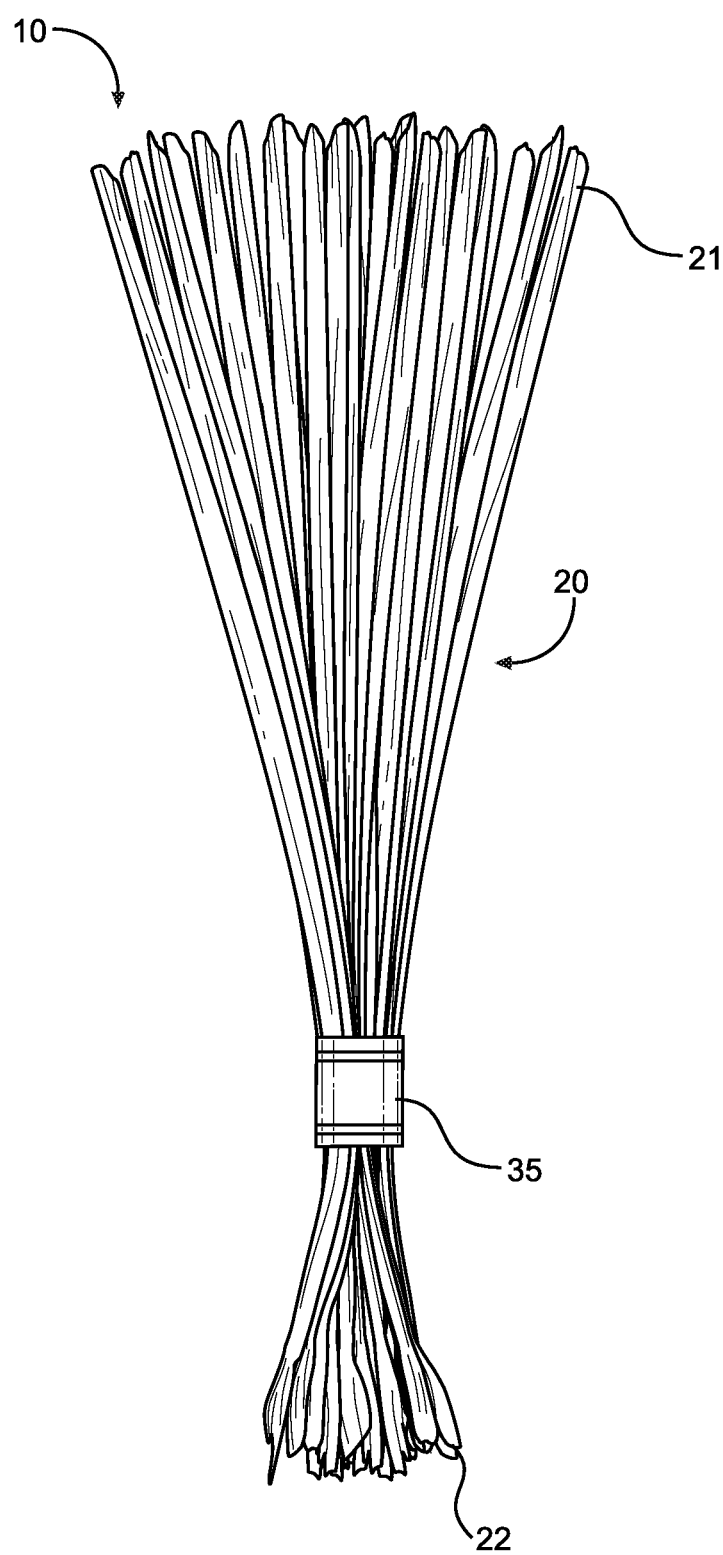
FIG. 3 depicts a front view of an alternate embodiment of a synthetic grass covering apparatus of the present invention.

FIG. 3 depicts a front end view of an alternate embodiment of said synthetic grass covering 10 of the present invention generally comprising a plurality of said synthetic grass blades 20. Referring to FIG. 3, said grass blades 20 are oriented in a substantially bundled configuration, wherein said second end 22 of each of said grass blades 20 are attachably connected and bound together, and wherein said first end 21 of said grass blades 20 are oriented in a substantially loose and fan-like configuration.

Still referring to FIG. 3, said second end 22 of said grass blades 20 can be attachably connected by way of being tied together with an additional synthetic grass blade 35, or any other similar cable, cord, or string, having like characteristics.

FIG. 4 depicts a perspective view of said synthetic grass covering apparatus 10 of the present invention in use by a hunter 1. Said synthetic grass covering apparatus 10 comprises a plurality of blades 20 that can be manufactured from a substantially synthetic material, such as for example, a resin material, or any other similar material exhibiting like characteristics. Said blades 20 can have a configuration that is typical of a real blade of grass, wherein a first end 21 of said blade 20 has a substantially tapered or jagged edge, thereby creating an illusion of being like a real actual blade of grass. Additionally, said blades 20 each have a substantially planar configuration, wherein said blades 20 comprising said synthetic material are manufactured in a substantially thin sheet of said synthetic material.

Said synthetic grass blades 20 of said grass covering apparatus 10 comprise a first end 21 and a second end 22. As illustrated in FIG. 4, said first end 21 of said synthetic blades 20 are oriented in a substantially loose configuration relative to each blade 20, and said second end 22 of said synthetic blades 20 are attachably connected to each other.

Said second end 22 of said synthetic grass blades 20 are attachably connected to each other by way of being individually sewn together. As such, said second end 22 of said blades 20 are generally sewn together by way of said cord 30 or cable. Thus, as depicted in FIG. 4, said cord 30 that is sewn to said second end 22 of said synthetic blades 20 helps to keep said blades 20 together in a substantially planar configuration, thereby creating said synthetic grass mat. However, it is to be observed that any configuration of said synthetic grass covering 10 depicted herein could also be utilized and depicted in FIG. 4.

Still referring to FIG. 4, said synthetic grass mat is then utilized by a hunter 1, or any other type of outdoorsman, in order to create an illusion of being hidden within the particular environment and thus remain hidden from waterfowl 2. As a result, said synthetic grass covering 10 is able to retain its synthetic properties, and therefore, is able to withstand a variety of different environmental elements and remain in a substantially wet and damp environment without rotting, molding, or deteriorating.

Although not depicted in the Figures, in a preferred embodiment, said synthetic grass covering apparatus can be painted in a particular manner and with particular colors in order to depict a conventional camouflage image or design or can be painted in a particular orientation in order to blend with a variety of different colors within an existing outdoor environment.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. A synthetic grass apparatus for use in camouflaging and concealing purposes, comprising a plurality of synthetically manufactured grass blades:
   a) wherein each of said synthetically manufactured grass blades has a first end and a second end,
   b) wherein said synthetically manufactured grass blades are manufactured from a synthetic resin material that comprises a waterproof substance and prevents said synthetic grass apparatus from molding, deteriorating, or breaking,
   c) wherein said synthetically manufactured grass blades are manufactured in a blend of natural colors to give a grass-like appearance,
   d) wherein said synthetically manufactured grass blades are attachably connected to each other by way of said synthetically manufactured grass blades being sewn together in order to allow for said synthetic grass apparatus to be able to stand vertically upright, and
   e) wherein said synthetically manufactured grass blades are sewn together at both said first end of said synthetically manufactured grass blades and at said second end of said synthetically manufactured grass blades, wherein said synthetically manufactured grass blades are oriented in a substantially side by side and planar configuration, thereby creating a mat-like orientation and appearance.

2. A method of camouflaging and concealing, comprising:
   a) making a synthetic grass apparatus, wherein said synthetic grass apparatus comprises:
      i) a plurality of synthetically manufactured grass blades,
      ii) wherein each of said synthetically manufactured grass blades has a first end and a second end,
      iii) wherein said synthetically manufactured grass blades are manufactured from a synthetic resin material, iv) wherein said synthetically manufactured grass blades are manufactured in a blend of natural colors to give a grass-like appearance, and v) wherein said synthetically manufactured grass blades are attachably connected to each other, b) placing said synthetic grass apparatus in an outdoor environment suitable for hunting and other various outdoor activities, and c) allowing said synthetic grass apparatus to cover and camouflage a user during hunting and other various outdoor activities.

3. The method of claim 2, wherein said synthetic material comprises a waterproof substance and prevents said synthetic grass apparatus from molding, deteriorating, or breaking.

4. The method of claim 3, wherein said synthetically manufactured grass blades are attachably connected to each other by way of said synthetically manufactured grass blades being sewn together in order to allow for said synthetic grass apparatus to be able to stand vertically upright.

5. The method of claim 4, wherein said synthetically manufactured grass blades are sewn together at said second end of each of said synthetically manufactured grass blades, wherein said synthetically manufactured grass blades are oriented in a substantially side by side and planar configuration, thereby creating a mat-like orientation and appearance.

6. The method of claim 4, wherein said synthetically manufactured grass blades are sewn together at both said first end of said synthetically manufactured grass blades and at said second end of said synthetically manufactured grass blades, wherein said synthetically manufactured grass blades are oriented in a substantially side by side and planar configuration, thereby creating a mat-like orientation and appearance.

7. The method of claim 3, wherein said synthetically manufactured grass blades are attachably connected to each other by way of said synthetically manufactured grass blades being tied together at a second end of each synthetically manufactured grass blade into a substantially bundled configuration in order to allow for said synthetic grass apparatus to be able to stand vertically upright and in order to allow for said synthetic grass apparatus to be unbundled.

* * * * *